Aug. 19, 1969 J. AVINS 3,462,694

FREQUENCY MODULATION DETECTOR CIRCUIT PROVIDING BALANCED DETECTION OVER A WIDE RANGE OF SIGNAL LEVELS

Filed Feb. 28, 1966 2 Sheets-Sheet 1

INVENTOR.
JACK AVINS
BY
Eugene M. Whitacre
Attorney

FREQUENCY MODULATION DETECTOR CIRCUIT PROVIDING
BALANCED DETECTION OVER A WIDE RANGE
OF SIGNAL LEVELS
Filed Feb. 28, 1966 2 Sheets-Sheet 2

INVENTOR.
JACK AVINS
BY Eugene M. Whitacre
Attorney 3,462,694

FREQUENCY MODULATION DETECTOR CIRCUIT PROVIDING BALANCED DETECTION OVER A WIDE RANGE OF SIGNAL LEVELS

Jack Avins, Princeton, N.J., assignor to Radio Corporation of America, a corporation of Delaware Continuation-in-part of application Ser. No. 396,178, Feb. 28, 1966, now Patent No. 3,383,607. This application Feb. 28, 1966, Ser. No. 530,480
Int. Cl. H03d 1/18, 3/02
U.S. Cl. 329—110 12 Claims

ABSTRACT OF THE DISCLOSURE

A high performance frequency modulation detector circuit especially suited for fabrication using integrated circuit techniques, includes a predominantly resistive load network having a time constant of the order of the period or less of an applied angle modulated wave. Average detection is employed, with filtering of the signal frequency and its harmonics being provided by the distributed capacitance of the detector load resistors, with or without augmentation by the capacitance of additional reverse biased rectifiers. Resistive arrangements are additionally included to maintain the detector output point at substantially the same direct potential so as to provide balanced detection over a wide range of input signal levels.

This invention relates to angle modulated wave demodulating circuits. More particularly, it relates to an improvement of the angle modulated wave detection system described in my continuation-in-part application Ser. No. 396,178, filed concurrently with this application, and also entitled "Signal Translating System" (now Patent No. 3,383,607).

My continuation-in-part application Ser. No. 396,178 describes a frequency modulation detector circuit which may be fabricated using integrated circuit techniques. As is described therein, such fabrication is made possible by constructing the circuit as a sampling or average type detector rather than as the more conventional peak type detector. This construction does away with the need for the large capacitors normally used in such prior art detectors and eliminates the known problems large capacitors present to integrated circuit design. At the same time, such construction permits the use of a relatively small amount of capacitance to filter the frequency modulated signal. As is also described in the Ser. No. 396,178 application, that capacitance may be provided by the distributed capacitance of integrated detector load resistors, and may further be augmented by the use of the relatively small capacitance of reverse biased rectifier devices.

My continuation-in-part application Ser. No. 396,178 also describes how the average type of FM detector might be connected to symmetrically drive, and provide the operating bias for, a transistor audio amplifier, also integrated on the same monolithic semiconductor chip.

It is an object of the present invention to provide an integrated angle modulated wave detection system similar to that described above, but with the additional feature that balanced detection is maintained even for low level signal operation.

In accordance with an embodiment of the invention, an angle modulated wave detection system includes a frequency discriminator transformer having a primary winding to which angle modulated signals are applied and a secondary winding coupled to the primary winding. It also includes a pair of rectifier devices and a substantially resistive load network. The detection system additionally includes means connecting at least a portion of the secondary winding, the rectifier devices and the resistive load network in series for providing substantially average detection of the angle modulated signals. The system further includes circuit means connected to the load network for maintaining balance detection over a wide range of signal levels.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

The integrated circuit of the invention will be described in the context of a television receiver. It is to be understood, however, that the fundamental concepts to be described are more generally applicable. For example, the circuit may be used in broadcast or communication receivers.

Figure 1:
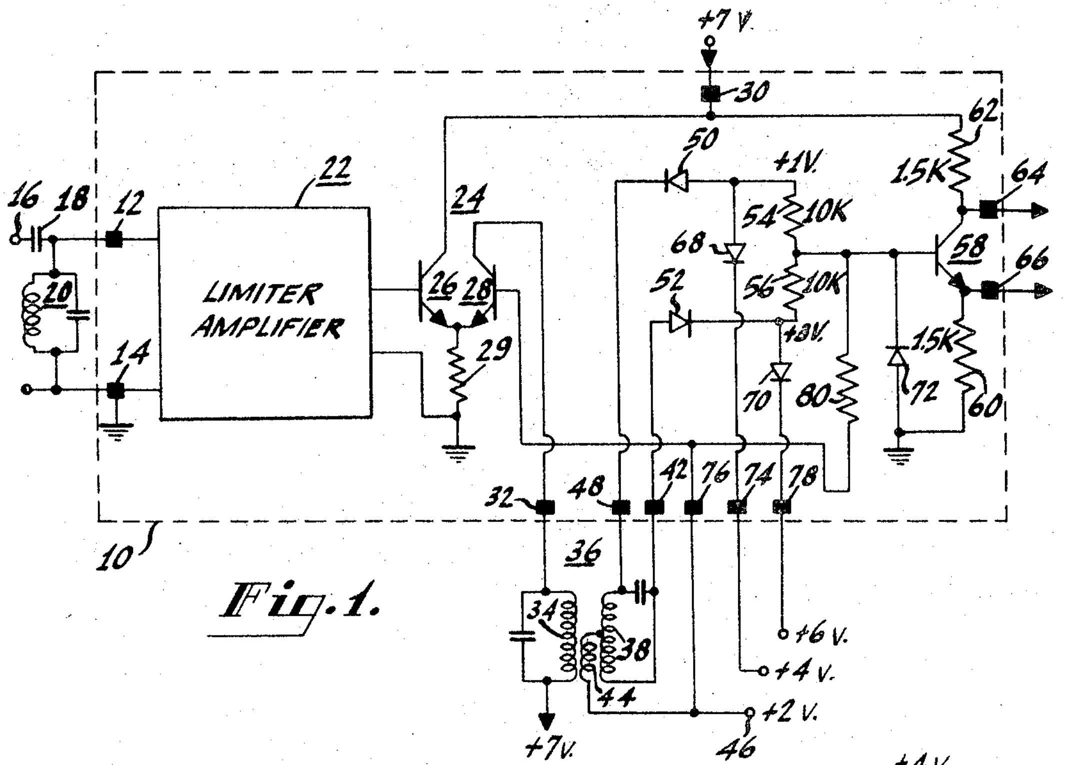
FIGURE 1 is a schematic circuit diagram of an angle modulated wave processing channel embodying the invention.

The schematic circuit diagram of FIGURE 1 shows an example of specific circuitry embodying the invention. The dashed rectangle 10 schematically illustrates a monolitic semiconductor circuit chip. The chip has a plurality of contact areas about the periphery thereof through which connections to the circuit on the chip may be made. For example, the chip 10 has a pair of contact areas 12 and 14 which are coupled to a source of FM waves. The contact area 14 provides a common or ground potential contact area which is connected to the various circuit-ground connections shown on the chip. As to physical dimensions, the chip 10 may be of the order of 50 mils x 50 mils, or smaller.

FM signals from a suitable source, such as a video detector or video amplifier of a television receiver, are applied to a terminal 16 and coupled through a capacitor 18 to a resonant circuit 20 which is tuned to the 4.5 mc./s. intercarrier beat between the video and sound carriers of a television signal. The resonant circuit 20 and the coupling capacitor 18 in the present example are external to the chip, but are coupled thereto through the contact areas 12 and 14.

The contact areas 12 and 14 are coupled to a limiter amplifier 22 which is of a design susceptible to integrated circuit fabrication processes. By way of example, the circuitry incorporated in the limiter amplifier 22 may be of the type described in applications of Jack Avins, Ser. Nos. 396,140 and 296,206, filed Sept. 14, 1964, both entitled "Signal Translating System (now Patent Nos. 3,766,-

889 and 3,355,669, respectively)." The limiter amplifier stage 22 is connected to drive an emitter coupled amplifier-limiter stage 24 including a pair of transistors 26 and 28. The emitter electrodes of the transistors 26 and 28 are connected in common through a resistor 29 to ground. The collector electrode of the transistor 26 is connected to an operating potential supply contact area 30 which is adapted to be connected to a positive terminal of an operating potential supply source, not shown.

The collector electrode of the transistor 28 is connected to a second positive terminal on the operating potential supply source through a contact area 32 and the primary winding 34 of a tuned phase-shift discriminator transformer 36. The secondary winding 38 of the discriminator transformer 36 is connected between a pair of contact areas 48 and 42, and a tertiary winding 44 is connected between a centertap on the secondary winding 38 and an operating potential supply terminal 46.

The secondary winding 38 of the discriminator transformer is connected to drive a pair of oppositely poled rectifier devices 50 and 52. A pair of load resistors 54 and 56 are connected in series between the anode of the rectifier 50 and the cathode of the rectifier 52 to form a series circuit therewith and with the secondary winding 38 of the transformer 36. The discriminator circuit demodulates applied frequency modulated signals, with the demodulated signals appearing at the junction of the resistors 54 and 56. The demodulated signals are applied to, and provide the base current drive for a transistor 58 which has, for example, equal valued emitter and collector resistors 60 and 62 respectively. The transistor 58 is connected as an audio frequency amplifier, and push-pull output signals may be derived at the contact areas 64 and 66. If desired, single-ended audio signals may be derived at one or the other of the contact areas 64 and 66.

In addition to the foregoing, the discriminator circuit includes three reverse-biased rectifier devices 68, 70 and 72. The rectifier device 68 is connected between the anode of the rectifier 50 and a contact area 74 which is adapted to be connected to a positive terminal of the operating potential supply source. The rectifier 70 is connected between the cathode of the rectifier 52 and a contact area 78 which is connected to another positive terminal of the operating potential supply source, and the rectifier 72 is connected between the base electrode of the transistor 58 and ground. A contact area 76, which is adapted to be connected to still another positive terminal of the operating potential supply source, is connected to the base electrode of the transistor 28 to provide the desired bias voltage therefor.

Before describing the operation of the FM demodulator circuit, it will be noted that the operating potential supply provides four different voltages for application to the contact areas 30, 74, 76 and 78. As indicated in FIGURE 1, these voltages are plus 7 volts, plus 4 volts, plus 2 volts and plus 6 volts, respectively each being measured with respect to ground. In addition, a reference potential point for the operating potential supply is connected to the grounded contact area 14. It is to be understood that a single operating potential supply contact area and a ground contact area may be connected to the chip, and the various voltages may be derived from a suitable tapped resistive or rectifier voltage divider formed on the chip, as described in the above noted applications.

In the operation of the circuit as thus far described, amplitude limited frequency modulated waves are applied between the base electrode of the transistor 26 and ground. The emitter coupled amplifier 24 provides further limiting of the wave so that the output current in the collector circuit of the transistor 28 is essentially a square wave or a limited wave of substantially constant amplitude. The limited wave is applied through the tuned primary and secondary windings of the discriminator transformer 36 to the rectifiers 50 and 52. The load circuit for these two rectifiers comprises the resistors 54 and 56 and the reverse biased rectifiers 68 and 70 which function as small filter capacitors. The reverse biased rectifier 72 provides additional capacitance, across which the demodulated audio signal is developed.

By returning the tertiary winding 44 of the discriminator transformer 36 to a positive voltage, for example plus 2 volts with respect to ground at terminal 46, the input electrodes of the rectifiers 50 and 52 are also raised to this voltage. Since the load impedance between the junction of the load resistors 54 and 56 is large relative to either of these resistors, the same plus 2 volts appears at the junction of resistors 54 and 56 when the applied signal is at the center signal frequency and strong enough to drive the diodes 50 and 52 into full conduction. Thus, bias current is provided through the discriminator network for the output amplifier transistor 58. On either side of the center signal frequency, the output voltage swings above and below the plus 2 volts in accordance with the frequency modulation.

In the circuit described, an average D-C potential of about 1 volt is developed across each of the resistors 54 and 56 due to rectification of the applied carrier wave. Hence the voltage at the anode of the rectifier 70 is about 3 volts positive and the voltage at the anode of the rectifier 68 is about 1 volt positive, both with respect to ground. Since the cathodes of the rectifiers 68 and 70 are returned to plus 4 and plus 6 volts respectively, both rectifiers are reverse biased by about 3 volts. As noted above, the junction of the resistors 54 and 56 is at a potential of about plus 2 volts so that the rectifier 72 is reverse biased by that amount.

In the circuit of FIGURE 1, average detection is employed with a substantially resistive load. Filtering of the signal frequency and of its harmonics is provided by the distributed capacitances of the load resistors 54 and 56, and this filtering is further augmented by the capacitances provided by the reverse biased rectifiers 68, 70 and 72.

The foregoing discussion has proceeded under the assumption that the signal level at the input electrodes of the rectifiers 50 and 52 is sufficiently large to overcome the "contact" potential of those devices. Under such circumstances, alternate half cycles of the signal forward bias the rectifiers 50 and 52 so that a conductive path is provided from the plus 2 volt terminal 46 to the junction of the resistors 54 and 56, i.e., to the output point of the detector. When transistor 58 is added to amplify the audio frequency signal developed at that junction, rectifier 52 also provides a conductive path for the base current of transistor 58. The signal translating system as thus far described is identical to that disclosed in my continuation-in-part application Ser. No. 396,178.

It will be noted that under zero signal conditions, the voltage at the junction of load resistors 54 and 56 is about 1.4 volts. The reason for this is that about 0.6 volt of the 2 volt supply is dropped across the rectifier 52, and the voltage drop across the load resistor 56 is negligible since its resistance is small compared to the resistance from the junction of resistors 54 and 56 to ground. As the signal level increases the voltage at the junction of the resistors 54 and 56 also increases. When the signal level is sufficient to drive the rectifiers 50 and 52 fully conductive the voltage at the junction of the resistors 54 and 56 rises to 2 volts.

Thus for low signal levels the circuit becomes unbalanced, and the voltage at the junction of resistors 54 and 56 varies, with signal level by an amount which is large relative to the demodulated signal. Stated otherwise, the AM rejection of the system suffers. Second, the demodulation characteristic of the circuit becomes nonlinear for low level signals because a portion of the signal swing is used to overcome the "contact" potential of the rectifiers, and also because the base current for the amplifier 58 is supplied, at low signal levels, in an unbalanced manner through the rectifier 52.

The schematic circuit diagram of FIGURE 1, however, further includes a resistive connection between the audio frequency output point and the low signal potential side of the discriminator winding to provide an auxiliary current path at low signal levels. To be more specific, this connection comprises the resistor 80 connected between the junction of the resistors 54 and 56 and the contact area 76 connected to the operating potential supply terminal 46. When the signals applied to the input electrodes of the rectifiers 50 and 52 now drop down to a low level, the resistor 80 maintains the voltage at the junction of the resistors 54 and 56 at the 2 volt level. Furthermore, the base drive current for the transistor 58 is through the resistor 80 so that nonlinearities due to the unsymmetrical base drive current through the rectifier 52 are substantially reduced.

Figure 2:
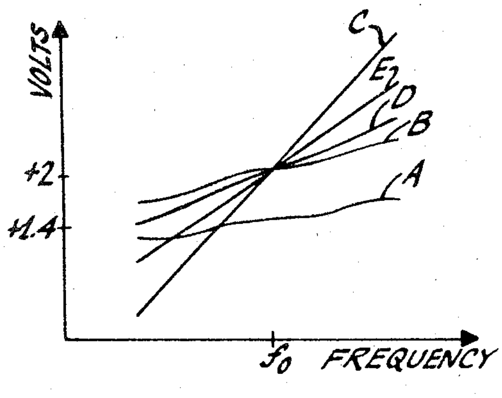
FIGURE 2 is a graph helpful in explaining the advantages of the present invention.

The effect of such a compensating resistor as 80 is shown in the graph of FIGURE 2. A represents the discriminator characteristic for low level signal inputs without the resistor 80 while B represents the characteristic for the same signal level with the resistor 80 included in the circuit. C in FIGURE 2 represents the discriminator characteristic for high level signal inputs without the resistor 80 while E represents the characteristic with resistor 80 present. It will be noted from the characteristics B, C and E that the D-C voltage at the junction of the resistors 54 and 56 at the center frequency $f_0$ is plus 2 volts for each. The FM detector is thus balanced for both high level and low signal inputs. With respect to curves A and B, it will be noted that at low signal levels the discriminator becomes unbalanced without the resistor 80, since curve A lies below the 2 volt axis. In addition it will be noted that curve A exhibits a greater degree of non-linearity than curve B.

Figure 3:
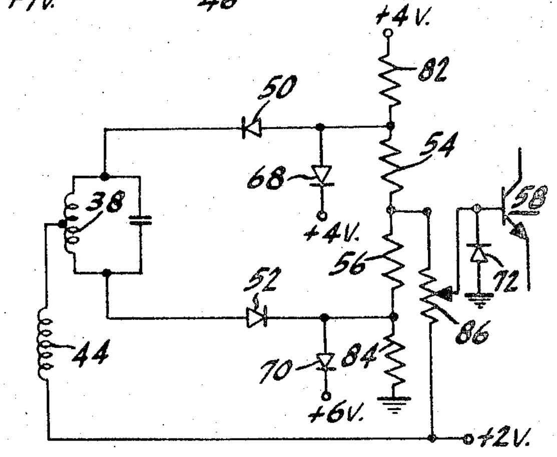
FIGURE 3 is a schematic circuit diagram of a modification of a discriminator circuit embodying the invention.

The schematic circuit diagram of FIGURE 3 shows an alternative connection which permits balanced detector operation down to very low input signal levels. A first resistor 82 is shown connected between the anode of rectifier 50 and the plus 4 volt terminal of the operating potential supply via a contact area (not shown) while a second resistor 84 is connected between the cathod of rectifier 52 and ground. These two resistors are chosen to be substantially equal so as to develop a D-C voltage of plus 2 volts at the junction of resistors 54 and 56. By proper choice of values for resistors 82 and 84, this connection can be used to bias the rectifiers 50 and 52 near the knee of their current-voltage characteristics to maintain discriminator balance for low signal levels. Such forward biasing improves the linearity of the discriminator characteristic, as shown by D in FIGURE 2, as compared with curves A and B if 82 and 84 were omitted. The audio frequency output continues to be taken at the junction of resistors 54 and 56. It will be noted that other combinations of resistance values and voltages can be used to provide a D-C voltage of plus 2 volts at the junction of these two resistors.

If desired, a volume control 86 can be connected between the junction of resistors 54 and 56 and the plus 2 volt potential terminal 46. At center frequency, no D-C voltage is present between these two points to produce a noisy volume control action. Automatic frequency control and tuning indicator voltages can be alternatively obtained between the junction and the plug 2 volt terminal.

Figures 4, 5, 6:
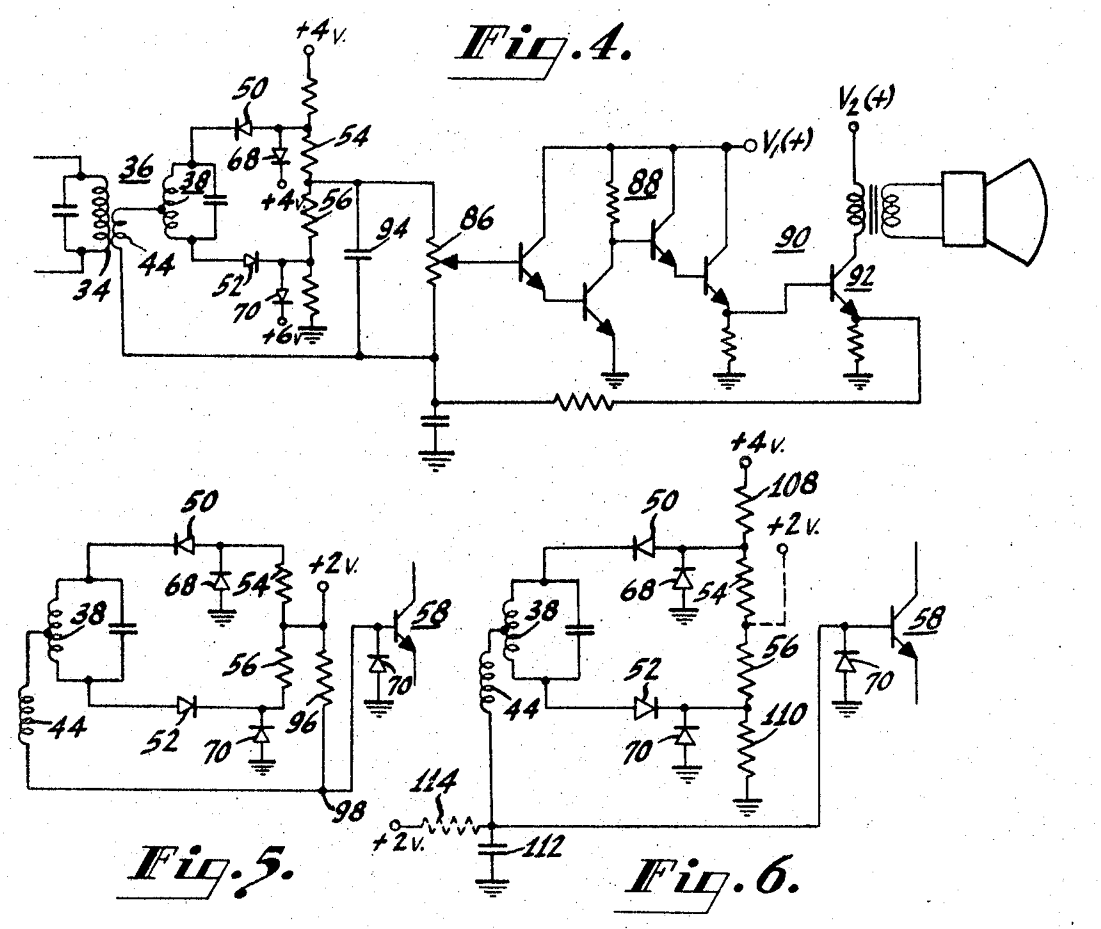
FIGURE 4 is a schematic circuit diagram of another form of angle modulated wave processing channel embodying the invention.
FIGURE 5 is a schematic circuit diagram of an additional form of discriminator circuit embodying the invention.
FIGURE 6 is a schematic circuit diagram of another form of discriminator circuit embodying the invention.

FIGURE 4 shows a schematic circuit diagram of another angle modulated wave processing channel in which like reference numerals are used to designate parts corresponding to those described above in connection with FIGURE 1. In this embodiment of the invention, the output point of the detector (the junction of the resistors 54 and 56) is direct coupled through the volume control 86 and a driver stage 88 to the audio output stage 90. D-C feedback is provided by floating the entire detector network on the feedback voltage, which in this case is the voltage developed at the emitter electrode of the output transistor 92. This arrangement provides high D-C stability, maintains the discriminator balance even at low levels, and eliminates the need for coupling capacitors between the discriminator and driver, and between the driver and output transistor. It is particularly advantageous in integrated circuit application because the limiter, the discriminator network, and the driver circuit can be integrated on a single monolithic chip, with the phase-shift transformer and the volume control external to the chip. As before, there is no D-C voltage across the volume control 86 at center frequency.

As has previously been mentioned in both this application and my continuation-in-part application Ser. No. 396,178, the reverse biased rectifiers 68 and 70 of FIGURE 1 may be omitted without impairing the operation of the detector. However, it may be desirable to provide more capacitance than exhibited by the reverse biased rectifier 72 in order to improve radio frequency filtering and provide deemphasis. Such an arrangement is shown in FIGURE 4, for example, by the capacitor 94 shunting the volume control potentiometer 86. This capacitor 94 preferably is external to the integrated circuit chip.

Figure 7:
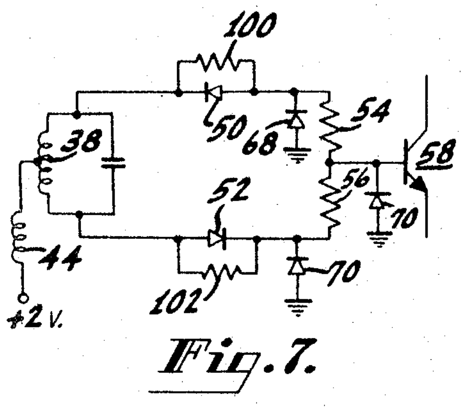
FIGURE 7 is a schematic circuit diagram of a further form of distriminator circuit embodying the invention.
Figure 8:
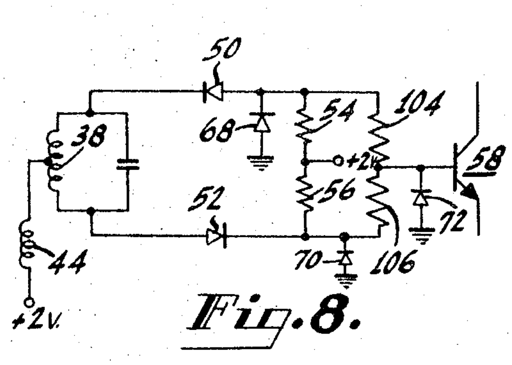
FIGURE 8 is a schematic circuit diagram of still another form of discriminator circuit embodying the invention.

The schematic circuit diagrams of FIGURES 5–8 show additional circuits for providing a conductive connection from the plus 2 volt reference potential terminal 46 to the audio frequency output point of the detecttor under conditions of low signal drive. In FIGURE 5, the junction of the resistors 54 and 56 is connected to the plus 2 volt potential terminal 46, a resistor 96 is connected between that junction and a point 98 on the tertiary winding 44 (the detector output point) and the base electrode of the transistor 58 is connected to the point 98. In FIGURE 6, the tertiary winding 44 is grounded for signal frequencies by a capacitor 112, a pair of substantially equal valued resistors 108 and 110 serially connect the load resistors 54 and 56 between a plus 4 volt terminal and ground, and the base electrode of the transistor 58 is connected to the junction of the winding 44 and the capacitor 112 (the detector output point); the connection from the plus 2 volt terminal to the junction of the resistors 54 and 56 and the resistor 114 coupling that plus 2 volt terminal to the detector output point are both optional, the first to lower the audio output impedance of the detector and the second to prevent the audio take-off point from falling below the 2-volt level in the absence of signal. FIGURES 3 and 6 illustrate that the audio output can be taken off at either end of the discriminator network, i.e., either at the junction of the resistors 54 and 56 or at the low potential side of the tertiary winding 44. In FIGURE 7, a pair of resistors 100 and 102 shunt the rectifiers 50 and 52 respectively with all other connections being substantially the same as in FIGURE 1. In FIGURE 8, a pair of resistors 104 and 106 are serially connected across the resistors 54 and 56, the base electrode of the transistor 58 is connected to the junction of resistors 104 and 106 (the detector output point), and the tertiary winding 44 and the junction of resistors 54 and 56 are connected to the plus 2 volt supply terminal 46. It will be noted that like reference numerals are used in each of the FIGURES 5–8 to designate points corresponding to those described above in connection with FIGURE 1. It will also be noted that the additional resistors of these figures can easily be diffused on the integrated circuit chip, that the rectifiers 68 and 70 are reverse biased so that their anodes are both connected to ground, and that these rectifiers may be omitted from the chip without impairing the operation of the detector, although the radio frequency filtering is then reduced.

Although FIGURES 1 and 3–8 show transformer 36 as having a separate tertiary winding 44, it will be readily apparent to one skilled in the art that this winding can be eliminated by coupling the high signal potential side of the primary winding 34, or a tap thereon to the center-tap on the secondary winding 38. If desired the center-tap on winding 38 may be directly connected to a high axial potential point on primary winding 34 and thereby, the positive voltage for the discriminator network may then be obtained directly from the winding 34.

I claim:

1. An angle modulated wave demodulating system comprising:

a first winding providing a first input circuit for supplying angle modulated waves;

first and second rectifiers;

a first resistor;

means connecting said first winding, said first rectifier, said first resistor, and said second rectifier in the order named in a circuit loop, with said first and second rectifiers poled in the same direction in the loop;

a source of direct potential;

output circuit means;

means providing a second input circuit for supplying angle modulated waves, which at the center frequency are in phase quadrature with said first provided angle modulated waves;

means connecting said source of potential, said output circuit means and said means providing a second input circuit in series between a point on said first winding and a point on said first resistor; and means for maintaining substantially the same direct potential at said point on said first winding and at said point on said first resistor under zero signal conditions.

2. An angle modulated wave demodulating system as defined in claim 1 wherein said means providing a second input circuit for supplying angle modulated waves, said source of potential, and said output circuit means are connected in the order named, and said means for maintaining substantially the same direct potential comprises a second resistor connected between the junction of said second input circuit with said source of potential and said point on said first resistor.

3. An angle modulated wave demodulating system as defined in claim 1 wherein said means for maintaining substantially the same direct potential comprises a second and third resistor, a second source of direct potential greater than said first named source of direct potential, and means connecting said second resistor, said first resistor, and said third resistor in the order named and said second source of potential in a circuit loop.

4. An angle modulated wave demodulating system as defined in claim 3 wherein the resistance values of said first, second, and third resistors are such that the direct potential developed at the junction of said second resistor with said first resistor forward biases said first rectifier and the direct potential developed at the junction of said first resistor with said third resistor forward biases said second rectifier.

5. An angle modulated wave demodulating system as defined in claim 1 wherein said means for maintaining substantially the same direct potential comprises a pair of resistors respectively connected in parallel with said first and second rectifiers.

6. An angle modulated wave demodulating system as defined in claim 1 wherein said means for maintaining substantially the same direct potential comprises a pair of series connected resistors in parallel with said first resistor, and means connecting the junction of said pair of resistors to a terminal of said source of direct potential which is remote from said point on said first resistor.

7. An angle modulated wave demodulating system as defined in claim 1 wherein said means providing a second input circuit for supplying angle modulated waves, said output circuit means and said source of potential are connected in the order named, and said means for maintaining substantially the same direct potential comprises a second resistor connected between the junction of said second input circuit with said output circuit means and said point on said first resistor.

8. An angle modulated wave demodulating system as defined in claim 1 wherein said means providing a second input circuit for supplying angle modulated waves comprises a second winding and wherein said output circuit means includes amplifier means having an input terminal direct coupled to one of said point on said first resistor and a point on said second winding which is remote from said point on said first winding.

9. An angle modulated wave demodulating system as defined in claim 8 wherein detected angle modulated waves are developed at said input terminal and wherein there is further included a potentiometer control connected in parallel with the input circuit of said amplifier means for varying the amplitude of detected angle modulated waves coupled to said means.

10. An angle modulated wave demodulating system as defined in claim 8 wherein said source of direct potential includes a direct connection from an output terminal of said amplifier means for maintaining said potential constant.

11. An angle modulated wave demodulating system as defined in claim 3 wherein said means providing a second input circuit for supplying angle modulated waves comprises a second winding having a point at which detected angle modulated waves are developed and wherein there is further included a direct connection from said source of potential to said point on said first resistor for reducing the audio frequency output impedance of said system.

12. An angle modulated wave demodulating system as defined in claim 3 wherein there is also included a fourth resistor coupling said source of direct potential to said point on said first winding to forward bias said first and second rectifiers.

References Cited

UNITED STATES PATENTS

| | | | |
|---|---|---|---|
| 3,063,019 | 11/1962 | De Waard et al. | 329—129 |
| 3,130,372 | 4/1964 | Zajac | 329—130 |
| 3,290,608 | 12/1966 | Gschwandtner | 329—129 X |
| 3,355,669 | 11/1967 | Avins | 329—103 |

ALFRED L. BRODY, Primary Examiner

U.S. Cl. X.R.

307—233; 329—103, 129; 330—38

PO-1050
(5/69)

UNITED STATES PATENT OFFICE
CERTIFICATE OF CORRECTION

Patent No. 3,462,694 Dated August 19, 1969

Inventor(s) JACK AVINS

It is certified that error appears in the above-identified patent and that said Letters Patent are hereby corrected as shown below:

Column 1, lines 7-8, cancel "Continuation-in-part of application Ser. No. 396,178, Feb. 28, 1966, now Patent No. 3,383,607. This". Column 7, line 9, "application" should read -- Filed --.

SIGNED AND
SEALED
DEC 30 1969

(SEAL)
Attest:

Edward M. Fletcher, Jr.
Attesting Officer

WILLIAM E. SCHUYLER, JR.
Commissioner of Patents